(12) United States Patent
Achariyakosol et al.

(10) Patent No.: US 7,295,883 B2
(45) Date of Patent: Nov. 13, 2007

(54) METHOD AND APPARATUS FOR PROVIDING AUDIO SIGNALS

(75) Inventors: Art Achariyakosol, Austin, TX (US); David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 10/442,390

(22) Filed: May 21, 2003

(65) Prior Publication Data

US 2003/0204277 A1 Oct. 30, 2003

Related U.S. Application Data

(63) Continuation of application No. 09/447,961, filed on Nov. 23, 1999, now abandoned.

(51) Int. Cl.
*G06F 17/00* (2006.01)

(52) U.S. Cl. ......................................... 700/94; 439/668

(58) Field of Classification Search .................. 700/94; 439/668–669, 626, 577; 370/473, 503; 381/11–12, 381/77
See application file for complete search history.

(56) References Cited

U.S. PATENT DOCUMENTS

| | | | |
|---|---|---|---|
| 4,682,325 A | 7/1987 | Hey, Jr. et al. | |
| 4,869,566 A * | 9/1989 | Juso et al. | 385/53 |
| 5,485,459 A | 1/1996 | Van Steenbrugge | |
| 5,556,107 A * | 9/1996 | Carter | 463/35 |
| 5,751,816 A * | 5/1998 | Howard | 381/300 |
| 5,809,245 A | 9/1998 | Zenda | |
| 5,841,993 A | 11/1998 | Ho | |
| 6,109,797 A * | 8/2000 | Nagura et al. | 385/88 |
| 6,119,091 A | 9/2000 | Huang et al. | |
| 6,149,469 A * | 11/2000 | Kim | 439/668 |
| 6,203,344 B1 * | 3/2001 | Ito | 439/218 |
| 6,226,758 B1 | 5/2001 | Gaalaas et al. | |
| 6,262,958 B1 * | 7/2001 | Ogihara et al. | 369/53.44 |
| 6,272,153 B1 * | 8/2001 | Huang et al. | 370/503 |
| 6,327,272 B1 | 12/2001 | Van Steenbrugge | |
| 7,151,970 B1 * | 12/2006 | Rapaich | 700/94 |

* cited by examiner

*Primary Examiner*—Vivian Chin
*Assistant Examiner*—Lun-See Lao
(74) *Attorney, Agent, or Firm*—Haynes and Boone, LLP

(57) ABSTRACT

An apparatus including an audio data processor is connected to a data bus to receive encoded digital audio signals. The audio data processor decodes the encoded digital audio signals, and transmits the decoded digital audio signals in different output formats to an audio output jack. The jack includes a first contact portion that receives one of the digital audio signals in one SPDIF format from the audio data processor. The jack also includes a second contact portion that receives another digital audio signal in another SPDIF format from the audio data processor. The jack receives a plug that includes at least two portions. A first portion of the plug receives one of the digital audio signals from the audio data processor, and a second portion of the plug receives the another of the digital audio signal from the audio data processor. The jack transmits one of the digital audio signals to the first portion of the plug, and the other of the digital audio signals to the second portion of the plug.

18 Claims, 4 Drawing Sheets

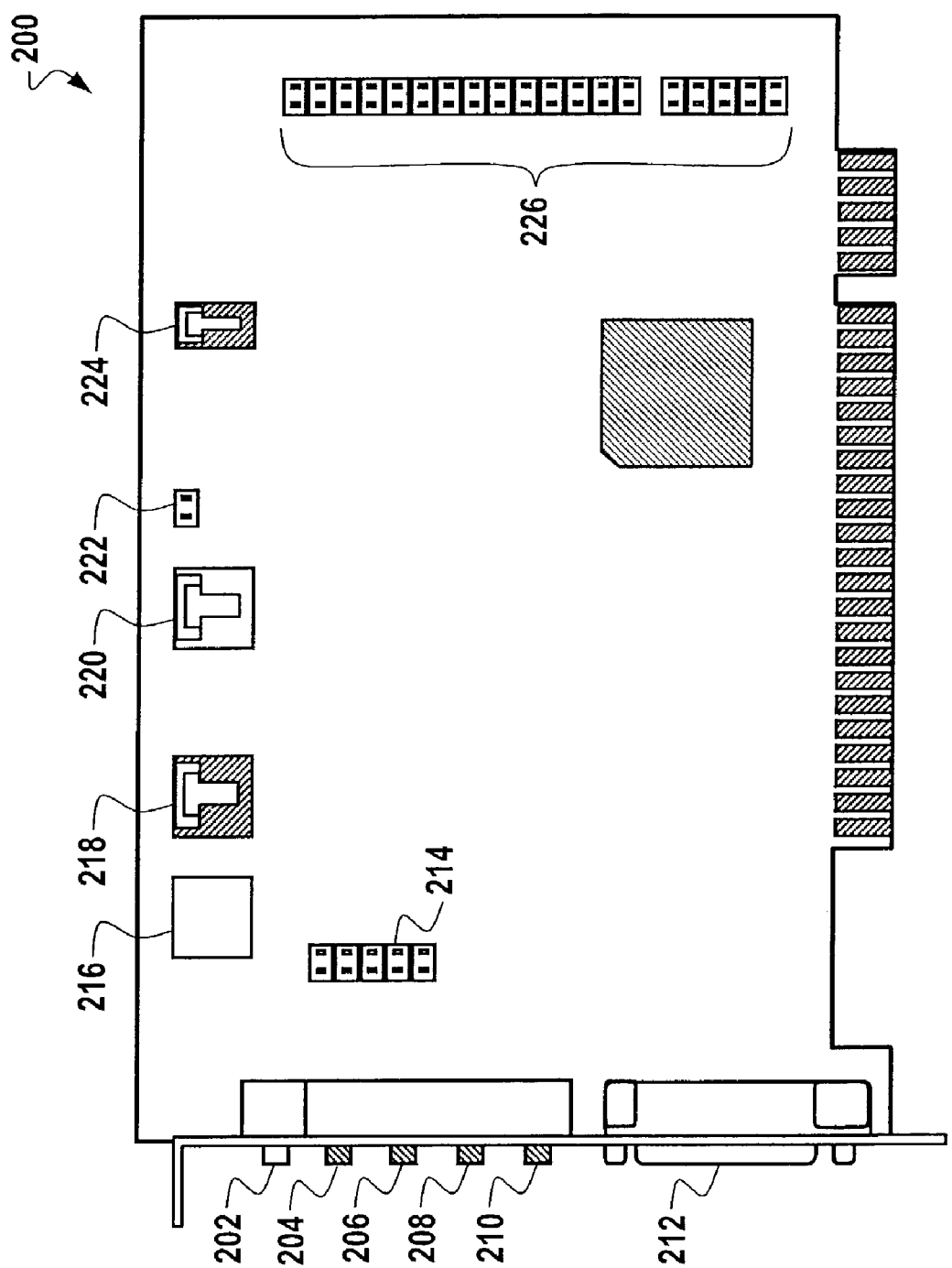

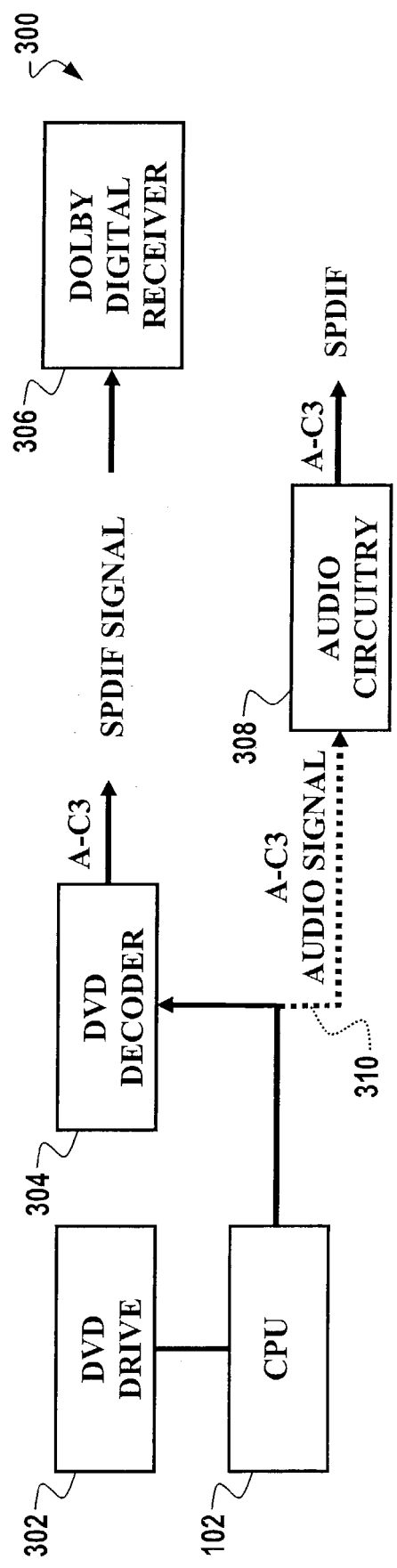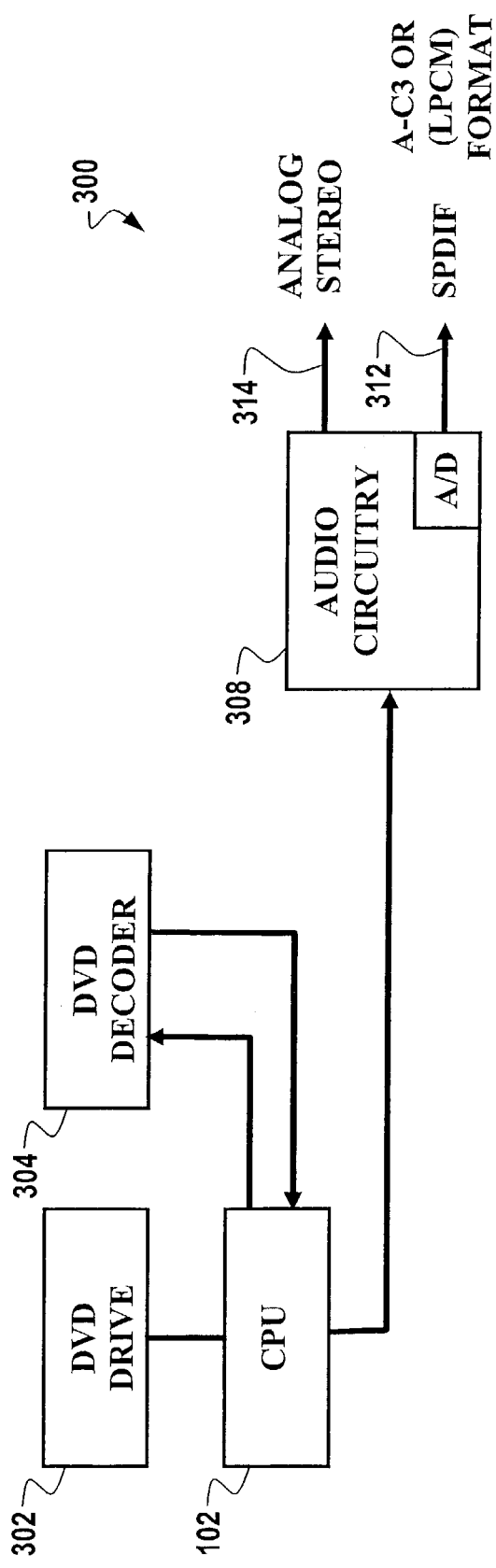

METHOD AND APPARATUS FOR PROVIDING AUDIO SIGNALS

CROSS-REFERENCE TO RELATED APPLICATIONS

This application is a Continuation of U.S. application Ser. No. 09/447,961, filed on Nov. 23, 1999 now abandoned.

BACKGROUND

This relates to computer audio systems, and more particularly, to a method and apparatus for providing audio in different formats simultaneously using the same stereo jack.

Competitive pressure and customer demand in the computer industry is currently forcing computer manufacturers to lower cost, reduce size, and increase performance of their products. The physical size of computer systems has decreased to the point where a system that fits on a user's desk or lap has greater capability than systems that used to fill an entire room. Along with demand for ever increasing processing speeds and higher resolution graphics displays, there is increasing demand for high-fidelity audio systems, such as 5 channel surround sound, in today's computer systems. Physical space limitations in today's computer systems often force trade-offs between capability and size.

Additionally, computer software applications that use digitized speech, audio, image, and video, have data storage and transmission capacity requirements that have grown and continue to grow at remarkable rates. In response to these requirements, data compression techniques are used to eliminate redundant and unusable information in the data while maintaining acceptable fidelity of the signal, thereby conserving storage space and transmission bandwidth. Several different compression techniques are commonly available for different types of data including speech, audio, image, and video data. Once the data is compressed, it is typically transmitted to a storage device for later retrieval, or to a device controller for output to a particular device such as a display monitor and a set of speakers. The compressed data is decompressed before being output to the device controller.

To preserve digital signal quality, it is desirable to avoid converting between analog and digital and transmit the compressed data entirely in the digital format. Thus, different devices must be able to communicate with one another within the digital domain. Transmission messages are a combination of digital signals and control messages that are formatted depending on the transmission standard being used. For example, one transmission interface standard that is commonly used to transmit digital audio data is the Sony-Philips Digital Interface Format (SPDIF), standardized by the International Electrotechnical Commission, Geneva, with reference number IEC958-1989.

SPDIF messages are divided into blocks of 192 frames, each frame comprising a number of sub-frames of 32 bits. The number of sub-frames that are used depends on the number of channels that are transmitted. For example, a CD player uses channels A and B (left/right) and therefore each frame contains two subframes. Each sub-frame includes a 20-bit field that carries audio signal information, and various control and information bit fields. SPDIF allows two types of data over the interface, compressed Dolby AC-3 (which includes 5.1 channels of surround-sound audio) and linear pulse code modulated (LPCM) (which includes 2 channels of CD-quality stereo audio). One of the bit fields is a channel status bit that indicates whether the channel format is AC-3 or LPCM. These formats therefore cannot be output simultaneously using SPDIF.

There are often situations where it is desirable to output both AC-3 and LPCM audio at the same time. For example, digital versatile disk (DVD) players are capable of outputting Dolby surround sound audio which uses AC-3 compressed format. Other audio components, such as CD players and voice synthesizers output LPCM audio. In many instances, there is a need to provide DVD audio while at the same time providing an audible message such as a low battery warning or e-mail notification.

Although it is possible to include a connector for each format, there may not be an adequate amount of space available for an additional connector on the backplate of the audio card. Further, one goal in designing computer systems is to reduce the number of components to the maximum extent possible for space and weight saving. Thus, an audio card capable of providing both AC-3 and LPCM audio signals from the same connector is desired.

SUMMARY

In accordance with one embodiment, there is provided an apparatus including a data processor connected to a data bus to receive compressed, encoded digital audio signals. The data processor decompresses the encoded digital audio signals, and transmits the decompressed audio signals to a decoder. The decoder transmits the decoded digital audio signals in different output formats to an audio output jack. The jack includes a first contact portion that receives one of the digital audio signals in one format from the data processor. The jack also includes a second contact portion that receives another digital audio signal in another format from the data processor.

The jack receives a plug that includes at least two portions. A first portion of the plug receives one of the digital audio signals from the decoder, and a second portion of the plug receives the another of the digital audio signals from the decoder. The jack transmits one of the digital audio signals to the first portion of the plug, and the other of the digital audio signals to the second portion of the plug.

In another embodiment, a plurality of digital audio signals in different digital formats are output to audio equipment such as one or more speakers and headphones. The method of outputting the digital audio signals includes receiving an encoded audio signal in a data processor, generating a first audio signal and a second audio signal in the data processor, transmitting the first audio signal from the data processor in one digital format, transmitting the second audio signal from the audio coded in another digital format, providing a plug having at least a first receiving portion and a second receiving portion, receiving the first audio signal in the one digital format in the first receiving portion of the plug, and receiving the second audio signal in the another digital format in the second receiving portion of the plug.

A jack is provided for receiving the plug. The jack includes a first contact portion that receives the first audio signal from the data processor, and a second contact portion that receives the second audio signal from the data processor. The first audio signal is transmitted to the first portion of the plug. The second audio signal is transmitted to the second portion of the plug.

One feature of the present disclosure is that it is also capable of providing an output signal to a monaural plug, i.e., only one audio signal may be output to a device.

In another embodiment, one of the digital audio signal is in LPCM format.

In another embodiment one of the digital audio signal is in AC-3 format.

In another embodiment, the plug is a ⅛ inch stereo plug and the jack is a ⅛ inch stereo jack.

Another feature of the plug is a sleeve portion and the jack includes a ground contact. The sleeve portion contacts the ground contact when the plug is received by the jack.

The foregoing has outlined rather broadly the objects, features, and technical advantages of the present disclosure so that the detailed description that follows may be better understood.

BRIEF DESCRIPTION OF THE DRAWINGS

The present disclosure may be better understood, and its numerous objects, features, and advantages made apparent to those skilled in the art by referencing the accompanying drawings.

FIG. 2 is a diagram of components on an audio card in a computer system.

FIG. 3A is a diagram of some of the components in an audio subsystem for a computer system.

FIG. 3B is a diagram of some of the components in another audio subsystem for a computer system.

The use of the same reference symbols in different drawings indicates similar or identical items.

DETAILED DESCRIPTION

Figure 1:
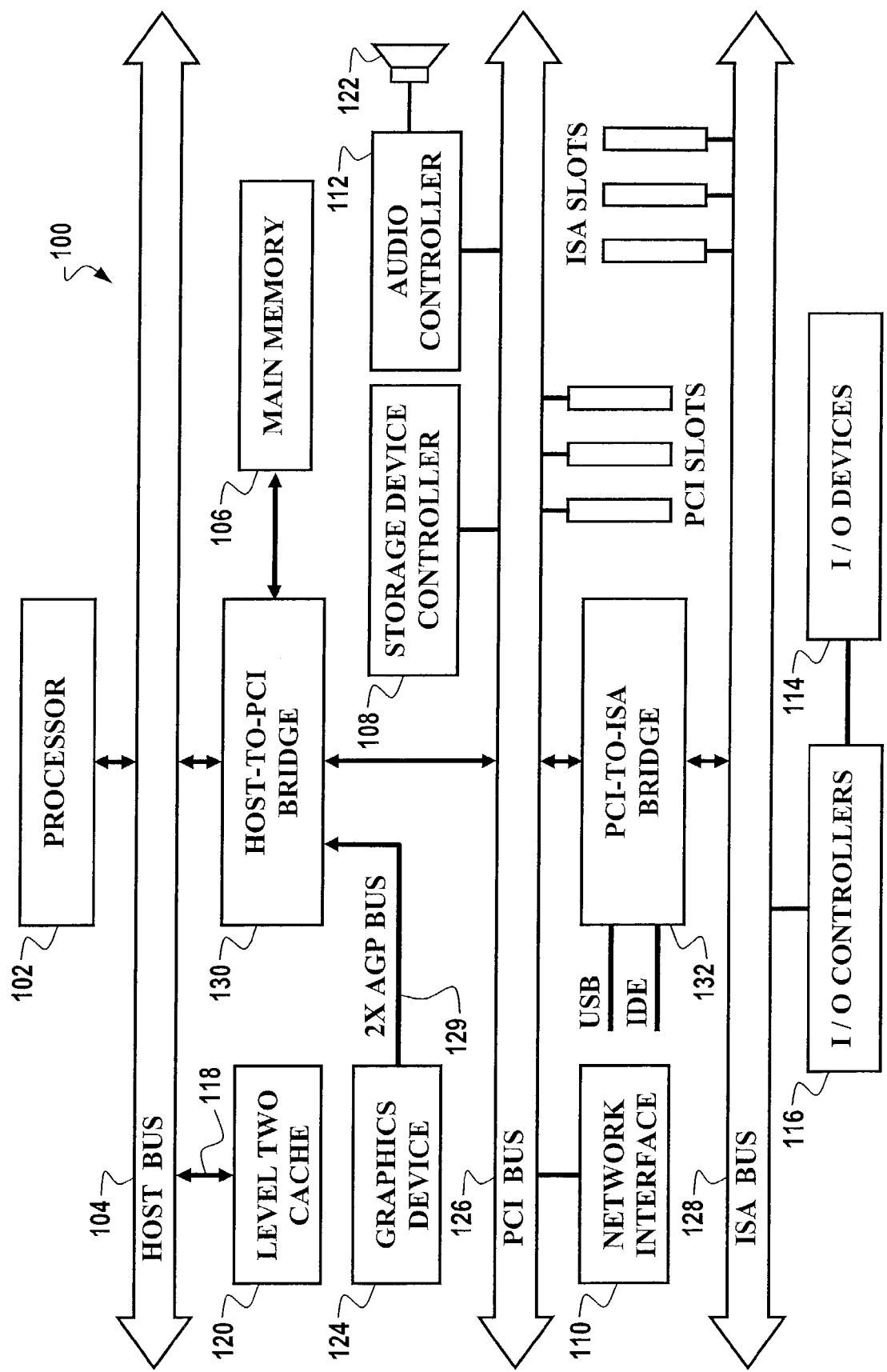
FIG. 1 is a block diagram of a typical computer system.

Referring to FIG. 1, computer system 100 includes a central processing unit (CPU) 102 connected by host bus 104 to various components including main memory 106, storage device controller 108, network interface 110, audio and video controllers 112, and input/output devices 114 connected via input/output (I/O) controllers 116. Those skilled in the art will appreciate that this system encompasses all types of computer systems including, for example, mainframes, minicomputers, workstations, servers, personal computers, Internet terminals, notebooks and embedded systems. Personal computer (PC) systems, such as those compatible with the x86 configuration, include desk top, floor standing, or portable versions. Typically computer system 100 also includes cache memory 120 to facilitate quicker access between processor 102 and main memory 106. I/O peripheral devices often include speaker systems 122, graphics devices 124, and other I/O devices 114 such as display monitors, keyboards, mouse-type input devices, floppy and hard disk drives, DVD drives, CD-ROM drives, and printers. The number of devices being added to personal computer systems continues to grow. For example, many computer systems also include network capability, terminal devices, modems, televisions, sound devices, voice recognition devices, electronic pen devices, and mass storage devices such as tape drives. The peripheral devices usually communicate with the processor over one or more buses 104, 126, 128, with the buses communicating with each other through the use of one or more bridges 130, 132. Computer system 100 may be one of many workstations connected to a network such as a local area network (LAN), a wide area network (WAN), or a global information network such as the Internet through network interface 110.

CPU 102 can be constructed from one or more microprocessors and/or integrated circuits. Main memory 106 stores programs and data that CPU 102 may access. When computer system 100 starts up, an operating system program is loaded into main memory 106. The operating system manages the resources of computer system 100, such as CPU 102, audio controller 112, storage device controller 108, network interface 110, I/O controllers 116, and host bus 104. The operating system reads one or more configuration files to determine the hardware and software resources connected to computer system 100.

During operation, main memory 106 includes the operating system, configuration file, and one or more application programs with related program data. Application programs can run with program data as input, and output their results as program data in main memory 106 or to one or more mass storage devices through a memory controller (not shown) and storage device controller 108. CPU 102 executes many application programs, including one or more programs to establish a connection to a computer network through network interface 110. The application programs may be embodied in one executable module or may be a collection of routines that are executed as required.

Storage device controller 108 allows computer system 100 to retrieve and store data from mass storage devices such as magnetic disks (hard disks, diskettes), and optical disks (DVD and CD-ROM). The mass storage devices are commonly known as Direct Access Storage Devices (DASD), and act as a permanent store of information. The information from the DASD can be in many forms including application programs and program data. Data retrieved through storage device controller 108 is usually placed in main memory 106 where CPU 102 can process it.

One skilled in the art will recognize that the foregoing components and devices are used as examples for the sake of conceptual clarity and that various configuration modifications are common. For example, audio controller 112 is connected to PCI bus 126 in FIG. 1, but may be connected to the ISA bus 128 or reside on the motherboard (not shown) in alternative embodiments. As a further example, although computer system 100 is shown to contain only a single main CPU 102 and a single system bus 104, those skilled in the art will appreciate that the present embodiments may be practiced using a computer system that has multiple CPUs 102 and/or multiple busses 104. In addition, the interfaces that are used in the preferred embodiment may include separate, fully programmed microprocessors that are used to off-load computationally intensive processing from CPU 102, or may include input/output (I/O) adapters to perform similar functions. Further, PCI bus 126 is used as an exemplar of any input-output devices attached to any I/O bus; AGP bus 129 is used as an exemplar of any graphics bus; graphics device 124 is used as an exemplar of graphics controller; and host-to-PCI bridge 130 and PCI-to-ISA bridge 132 are used as exemplars of any type of bridge. Consequently, as used herein the specific exemplars set forth in FIG. 1 are intended to be representative of their more general classes. In general, use of any specific exemplar herein is also intended to be representative of its class and the non-inclusion of such specific devices in the foregoing list should not be taken as indicating that limitation is desired.

FIG. 2 shows audio card 200 that is included with computer system 100 to provide audio data processing components and connectors for attaching audio peripherals such as speakers, a modem, headphones, a digital audio tape machine a motion video subsystem such as a TV tuner card, and a CD player. Connector ports 202 through 210, for receiving ⅛ inch jacks are included to interface with a variety of peripheral devices. Note that some or all of the data processing components and connectors associated with audio card 200 may alternatively be included on other circuit boards in computer system 100, i.e., it is not necessary to have an audio card or to have all audio components included on audio card 200. Further, the data processing functions may be distributed throughout one or more other data processing components in computer system 100.

One example of a connector that may be included is digital out jack 202 to connect an external digital device, such as a digital audio tape (DAT) machine that uses SPDIF for recording or playback. Other examples include line in jack 204 to connect external devices such as cassette, DAT, or MiniDisc player for playback or recording; microphone in jack 206 to connect an external microphone for voice input; line out jack 208 to connect powered speakers, headphones, or an external amplifier for audio output; and rear out jack 210 to connect powered speakers or an external amplifier for audio output.

Other types of connectors that may also be included on audio card 200 are joystick/MIDI connector 212, modem connector 214, telephone or audio only connector 216, CD audio connector 218 which connects to the analog audio output on a CD-ROM or DVD drive using a CD audio cable, auxiliary connector port 220 for connecting internal audio sources such as a TV tuner, MPEG, or other similar cards, speaker connector 222 which connects to a speaker connector on the motherboard of computer system 100, CD SPDIF connector 224 for connecting to the SPDIF digital audio input on a CD-ROM or DVD drive, and audio extension connector 226 which connects to a digital I/O card.

With DVD in computer system 100, advanced audio capabilities for surround sound are provided to allow a user to experience three-dimensional sounds that coincide with the display being generated. Computer system 100 also includes audio capabilities for other purposes such as issuing notices and warnings, and outputting 2-channel stereo sound. Different digital audio data compression techniques are used to compress different types of audio data. SPDIF can handle two types of compressed audio data: compressed Dolby AC-3 (which includes 5.1 channels of surround-sound audio) and linear pulse code modulated (LPCM) (which includes 2 channels of stereo audio).

FIG. 3a shows a diagram of some of the components in typical audio system 300 for a multi-media computer system. In FIG. 3a, a data source such as DVD drive 302 reads encoded, compressed audio and video data from DVD disks and is connected for data transfer with CPU 102. CPU 102 decompresses the audio and video data and routes the decompressed audio and video data to DVD decoder 304. DVD decoder 304 is an audio data processor that, among other functions, decodes the decompressed audio and video data and outputs the decoded audio data in SPDIF format to digital receiver 306.

Alternatively, CPU 102 or DVD decoder 304 supplies an A-C3 audio signal to audio circuitry 308 as shown by dashed line 310. Audio circuitry 308 typically includes an audio controller/coder/decoder to perform sample rate conversion, control I/O with audio card 200, and perform any other audio processing capabilities a manufacturer may wish to provide with a particular implementation of audio circuitry 308. The coder/decoder performs sample rate digital to analog and analog to digital conversions, signal mixing, and analog processing such as tone, stereo enhancement, surround sound enhancement, and delivering the combined signal for output to speakers, headphones, or other equipment. When an A-C3 signal is input to audio circuitry 308, it may be output directly in SPDIF format to a digital audio device.

The SPDIF signal may be in either LPCM format or AC-3 format, however, SPDIF cannot accommodate mixed data formats simultaneously, therefore only AC-3 or LPCM data can be output at one time. There are often situations where it is desirable to output both AC-3 and LPCM audio at the same time. For example, digital video disk (DVD) players are capable of outputting Dolby surround sound audio which uses AC-3 compressed format, whereas data from other audio components, such as CD players and voice synthesizers, is output using LPCM format. In the prior art, two separate SPDIF output ports would have to be provided to accommodate both formats simultaneously.

FIG. 3b shows an alternate audio system 300 for processing audio data in multiple formats. In FIG. 3b, a data source such as DVD drive 302 reads compressed audio and video data from DVD disks and is connected for data transfer with CPU 102. CPU 102 routes the encoded, compressed audio and video data to DVD decoder 304 which decodes the compressed audio and video data. DVD decoder 304 decompresses A-C3 signal to 5.1 channel audio and also mixes 5.1 channel audio data down to 2 channel (or stereo) data. DVD decoder 304 outputs the audio data to CPU 102. CPU 102 transmits the audio data to audio circuitry 308. Audio circuitry 310 outputs analog stereo signal 314, and may also include an analog to digital converter to provide SPDIF audio signals.

Figure 4:
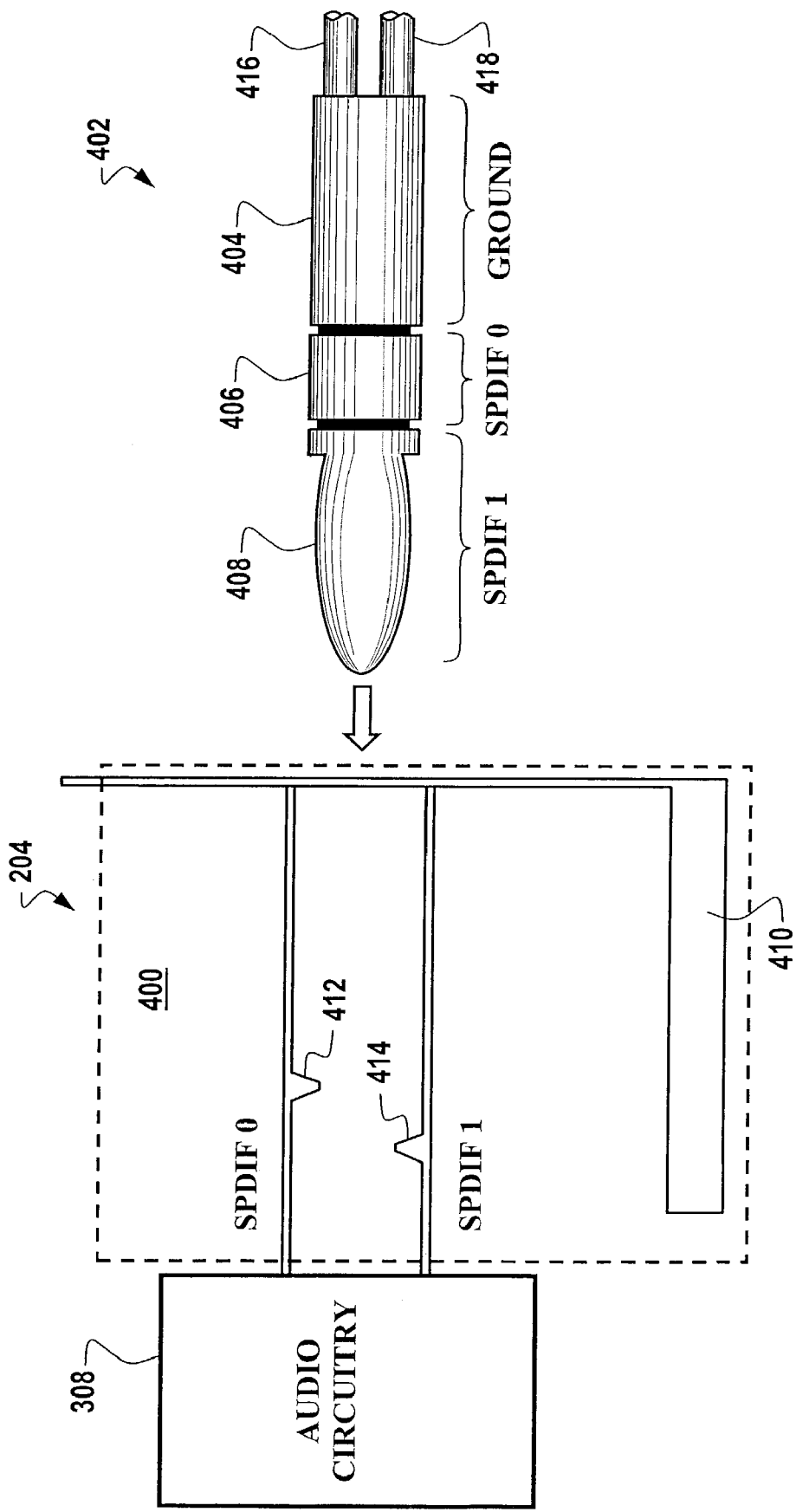
FIG. 4 is a diagram of an audio jack and plug.

The present disclosure advantageously saves cost and space by eliminating the need to add a second SPDIF connector 204 to audio card 200. FIG. 4 shows stereo plug 400 and stereo jack 402 for simultaneously outputting AC-3 audio and LPCM audio using the same stereo plug 400 and stereo jack 402.

Stereo jack 400 is adapted to make contact with plug 402 when one end of plug 402 is inserted in SPDIF connector 204. The other end of plug 402 is connected to audio speakers or other digital audio device. Plug 402 has ground sleeve 404, ring portion 406 for conducting signals corresponding to a first SPDIF output, SPDIF0, and tip portion 408 for conducting signals corresponding to second SPDIF output, SPDIF1.

SPDIF connector 204 includes stereo jack 400 having common ground 410, a ring or first contact portion 412, and a tip or second contact portion 414. When plug 402 is fully inserted into stereo jack 400, ring portion 406 contacts ring contact portion 412, tip portion 408 contacts tip contact portion 414, and ground sleeve 404 provides electrical shielding for plug 402 through common ground 410.

Using the configuration shown in FIG. 4, the first SPDIF output, SPDIF0, is output through ring portion 406, and the second SPDIF output, SPDIF1, is output through tip portion 408. Audio output signals 416 and 418 are connected to audio output equipment such as speakers and headphones. Advantageously, one of the audio output signals 416 may be output to one output device, while the other audio output signal 418 is output to a different output device, thereby allowing both signals to be output simultaneously. The present disclosure also accommodates situations where the user may have only a monaural plug instead of a plug capable of receiving multiple audio signals. In this situation, the monaural plug receives one of audio signals 416, 418, for output to a device.

In another embodiment, an SPDIF signal may be output through ring portion 406 or tip portion 408, and a different type of signal may be output through the other portion.

Audio output signals 416 and 418 are then connected to the desired audio output equipment such as speakers and headphones. Thus, the audio output signal 416 may be output to one output device, while the other output signal is output to a different output device, thereby allowing both signals to be output simultaneously.

While the disclosure has been described with respect to the embodiments and variations set forth above, these embodiments and variations are illustrative and the disclosure is not to be considered limited in scope to these embodiments and variations. Accordingly, various other embodiments and modifications and improvements not described herein may be within the spirit and scope of the present disclosure, as defined by the following claims.

What is claimed is:

1. An apparatus for providing different digital audio output signals simultaneously, the apparatus comprising:
   an audio circuit operable to receive a first audio signal from a first source and a second audio signal from a second source, the audio circuit being further operable in response to the first audio signal to transmit the first audio signal in digital format as a first digital audio signal, the audio circuit being further operable in response to the second audio signal to transmit the second audio signal in digital format as a second digital audio signal; and
   a tip-ring-sleeve jack-plug-compatible socket for simultaneously outputting the first and second digital audio signals, the socket including a first portion for conducting a signal corresponding to the first digital audio signal to a first audio device and a second portion for conducting a signal corresponding to the second digital audio signal to a second audio device.

2. The apparatus of claim 1, further comprising:
   a tip-ring-sleeve jack plug to electrically mate with the socket; and
   a cable electrically coupled to the jack plug to distribute the first digital audio signal to the first audio device and to distribute the second digital audio signal to the second audio device.

3. The apparatus of claim 1, wherein the first and second digital audio signals are transmitted in SPDIF format.

4. The apparatus of claim 1, wherein the first digital audio signal is an AC-3 audio signal and the second digital audio signal is an LPCM audio signal.

5. The apparatus, as set forth in claim 2, wherein the jack plug is a ⅛ inch stereo plug and the socket is a ⅛ inch stereo jack plug socket.

6. The apparatus, as set forth in claim 5, wherein the socket includes a ground contact, the sleeve portion of the tip-ring-sleeve jack plug contacting the ground contact when the jack plug is received by the socket.

7. A computer system comprising:
   an audio output circuit having first and second digital audio outputs, the audio circuit capable of simultaneously outputting first and second digital audio signals, based on first and second audio sources, on the first and second digital audio outputs;
   a data processor coupled to a data bus, the data processor being operable to direct first and second digital audio signals to the audio output circuit; and
   a tip-ring-sleeve jack-plug-compatible socket for simultaneously outputting the first and second digital audio signals, the socket including a first portion for conducting a signal corresponding to the first digital audio signal to a first audio device and a second portion for conducting a signal corresponding to the second digital audio signal to a second audio device.

8. The computer system of claim 7, further comprising:
   a tip-ring-sleeve jack plug to electrically mate with the socket; and
   a cable electrically coupled to the jack plug to distribute the first digital audio signal to the first audio device and to distribute the second digital audio signal to the second audio device.

9. The computer system of claim 7, wherein the first and second digital audio signals are transmitted in SPDIF format.

10. The computer system of claim 7, wherein the first digital audio signal is an AC-3 audio signal and the second digital audio signal is an LPCM audio signal.

11. The computer system, as set forth in claim 8, wherein the jack plug is a ⅛ inch stereo plug and the socket is a ⅛ inch stereo jack plug socket.

12. The computer system, as set forth in claim 11, wherein the socket includes a ground contact, the sleeve portion of the tip-ring-sleeve jack plug contacting the ground contact when the jack plug is received by the socket.

13. A method for outputting a plurality of digital audio signals, the method comprising:
   receiving first and second audio signals in an audio data processor;
   generating a first digital audio signal and a second digital audio signal in the audio data processor;
   transmitting the first and second digital audio signals from the audio data processor; and
   simultaneously outputting the first and second digital audio signals at a tip-ring-sleeve jack-plug-compatible socket, the socket including a first portion for conducting a signal corresponding to the first digital audio signal to a first audio device and a second portion for conducting a signal corresponding to the second digital audio signal to a second audio device.

14. The method of claim 13, further comprising coupling a cable having a tip-ring-sleeve jack plug at a first end to the socket using the tip-ring-sleeve jack plug, and distributing the first digital audio signal to the first audio device and the second digital audio signal to the second audio device using the cable.

15. The method of claim 13, wherein the first and second digital audio signals are transmitted in SPDIF format.

16. The method of claim 13, wherein the first digital audio signal is an AC-3 audio signal and the second digital audio signal is an LPCM audio signal.

17. The method, as set forth in claim 14, wherein the jack plug is an RCA stereo plug and the socket is an RCA stereo jack plug socket.

18. The method, as set forth in claim 17, wherein the socket includes a ground contact, the sleeve portion of the tip-ring-sleeve jack plug contacting the ground contact when the jack plug is received by the socket.

* * * * *